(12) United States Patent
Inoue et al.

(10) Patent No.: US 9,485,408 B2
(45) Date of Patent: Nov. 1, 2016

(54) IMAGING APPARATUS AND EXPOSURE DETERMINING METHOD

(71) Applicant: FUJIFILM Corporation, Tokyo (JP)

(72) Inventors: Kazuki Inoue, Saitama (JP); Yoichi Iwasaki, Saitama (JP); Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/716,536

(22) Filed: May 19, 2015

(65) Prior Publication Data

US 2015/0256738 A1    Sep. 10, 2015

Related U.S. Application Data

(63) Continuation of application No. PCT/JP2013/073390, filed on Aug. 30, 2013.

(30) Foreign Application Priority Data

Nov. 20, 2012  (JP) ................. 2012-254317

(51) Int. Cl.
*H04N 5/235* (2006.01)
*G02B 13/00* (2006.01)
(Continued)

(52) U.S. Cl.
CPC ............ *H04N 5/23212* (2013.01); *G02B 7/34* (2013.01); *G03B 13/36* (2013.01); *H04N 5/2351* (2013.01);
(Continued)

(58) Field of Classification Search
CPC .... H04N 5/367; H04N 9/045; H04N 5/3675; H04N 5/2176; H04N 5/361; H04N 5/23212; G03B 13/36; G03B 13/001; G03B 7/34
See application file for complete search history.

(56) References Cited

U.S. PATENT DOCUMENTS 8,704,933 B2    4/2014  Yamamoto 8,772,892 B2    7/2014  Okigawa
(Continued)

FOREIGN PATENT DOCUMENTS

| JP | 2004-264451 A | 9/2004 |
|---|---|---|
| JP | 2010-286826 A | 12/2010 |
| WO | WO 2012/026292 A1 | 3/2012 |

OTHER PUBLICATIONS

International Search Report issued in PCT/JP2013/073390, mailed on Nov. 26, 2013.
PCT/ISA/237—Issued in PCT/JP2013/073390, mailed on Nov. 26, 2013.

*Primary Examiner* — Twyler Haskins
*Assistant Examiner* — Fayez Bhuiyan
(74) *Attorney, Agent, or Firm* — Birch, Stewart, Kolasch & Birch, LLP

(57) ABSTRACT

It is intended to provide an imaging apparatus that enables proper exposure of phase difference detection pixels and thereby makes it possible to perform phase difference autofocusing with high accuracy. A system control unit 11 selects phase difference detection pixels from phase difference detection pixels 51R and 51L existing in a selected phase difference detection area 52 according to a position of the selected phase difference detection area 52 in a row direction X, and determines exposure conditions based on output signals of the selected phase difference detection pixels. A defocus amount calculation unit 19 calculates a defocus amount using output signals of the phase difference detection pixels 51R and 51L existing in the selected phase difference detection area 52 that are part of a shot image signal produced by shooting that is performed by an imaging device 5 under the exposure conditions determined by the exposure determining unit 11.

4 Claims, 11 Drawing Sheets

(51) Int. Cl.
  *G02B 7/34* (2006.01)
  *H04N 5/232* (2006.01)
  *G03B 13/36* (2006.01)
  *H04N 5/369* (2011.01)
  *H04N 9/77* (2006.01)

(52) U.S. Cl.
  CPC .......... *H04N 5/2353* (2013.01); *H04N 5/3696* (2013.01); *H04N 9/77* (2013.01); *G02B 13/001* (2013.01); *H04N 2209/049* (2013.01)

(56) References Cited

U.S. PATENT DOCUMENTS

| | | | |
|---|---|---|---|
| 8,830,384 B2 * | 9/2014 | Endo | H04N 5/3456 |
| | | | 250/208.1 |
| 9,167,183 B2 * | 10/2015 | Tanaka | H04N 5/3696 |
| 9,325,954 B2 * | 4/2016 | Aoki | H04N 5/3696 |
| 2012/0057043 A1 | 3/2012 | Yamamoto | |
| 2013/0161774 A1 | 6/2013 | Okigawa | |

* cited by examiner

IMAGING APPARATUS AND EXPOSURE DETERMINING METHOD

CROSS REFERENCE TO RELATED APPLICATION

This is a continuation of International Application No. PCT/JP2013/073390 filed on Aug. 30, 2013, and claims priority from Japanese Patent Application No. 2012-254317 filed on Nov. 20, 2012, the entire disclosures of which are incorporated herein by reference.

TECHNICAL FIELD

The present invention relates to an imaging apparatus and an exposure determining method.

BACKGROUND ART

In recent years, with the increase of the resolution of solid-state imaging devices such as COD (charge-coupled device) image sensors and CMOS (complementary metal-oxide-semiconductor) image sensors, the demand for information apparatus having a shooting function, such as digital still cameras, digital video cameras, cell phones (e.g., smartphones), and PDAs (personal digital assistants), has been increasing. In the following description, such information apparatus having a shooting function will be referred to as imaging apparatus.

In such imaging apparatus, a contrast AF (autofocus) method and a phase difference AF method are employed as focus control methods for detecting a distance to a major subject and focusing the apparatus on it. The phase difference AF method is employed in a wide variety of imaging apparatus because it can detect a focus position faster than the contrast AF method.

For example, Patent document 1 discloses an imaging apparatus in which part of the pixels of an imaging device are made phase difference detection pixels and phase difference autofocusing is performed using signals that are read out of the phase difference detection pixels.

Patent document 2 discloses an imaging apparatus in which an exposure is determined using an output signal of a phase difference AF sensor.

PRIOR ART DOCUMENTS

Patent Documents

Patent document 1: JP-A-2010-286826
Patent document 2: JP-A-2004-264451

SUMMARY OF THE INVENTION

Problems to be Solved by the Invention

In imaging apparatus like the one disclosed in Patent document 1 in which phase difference autofocusing is performed using signals that are read out of the phase difference detection pixels, the phase difference detection pixels are much lower in sensitivity than ordinary pixels. Therefore, to perform phase difference autofocusing with high accuracy, exposure conditions need to be determined so that a proper exposure is obtained for the phase difference detection pixels rather than the ordinary pixels.

The phase difference detection pixels are at least two kinds of pixels, that is, right-hand pixels for detecting light that passes through the right half, for example, of an imaging optical system and left-hand pixels for detecting light that passes through the left half, for example, of the imaging optical system. Being different in incident angle-sensitivity characteristic, right-hand pixels and left-hand pixels suffer sensitivity differences depending on their locations even if they have the same image height in the imaging device (the image height means a distance of a pixel concerned from a point where the optical axis of the imaging optical system intersects a pixels arrangement plane).

Therefore, to determine exposure conditions so that a proper exposure is obtained for the phase difference detection pixels, it is necessary to take into consideration sensitivity differences that depend on the locations of the phase difference detection pixels.

The present invention has been made in view of the above circumstances, and an object of the present invention is therefore to provide an imaging apparatus and an exposure determining method that enable proper exposure of phase difference detection pixels and thereby make it possible to perform phase difference autofocusing with high accuracy.

Means for Solving the Problems

The invention provides an imaging apparatus comprising an imaging device having a photodetecting surface in which plural imaging pixels and plural phase difference detection pixels are arranged, the plural imaging pixels detecting an image formed by a light beam that passes through a pupil region of an imaging optical system, the plural phase difference detection pixels including plural first phase difference detection pixels that detect one of a pair of images formed by a pair of light beams that pass through different portions of the pupil region of the imaging optical system and plural second phase difference detection pixels that detect the other of the pair of images, and plural phase difference detection areas being arranged in the photodetecting surface of the imaging device in a deviation direction of the pair of images, plural pairs of a first phase difference detection pixel and a second phase difference detection pixel being arranged in each of the plural phase difference detection areas; an exposure determining unit which determines exposure conditions on the basis of output signals of phase difference detection pixels existing in a selected one of the plural phase difference detection areas; and a defocus amount calculation unit which calculates a defocus amount using output signals of the first phase difference detection pixels and the second phase difference detection pixels existing in the selected phase difference detection area that are part of a shot image signal produced by shooting that is performed by the imaging device under the exposure conditions determined by the exposure determining unit, wherein the exposure determining unit selects phase difference detection pixels from the selected phase difference detection area according to a sensitivity difference between phase difference detection pixels that exhibit a highest sensitivity in the selected phase difference detection area and phase difference detection pixels that exhibit a lowest sensitivity in the selected phase difference detection area or a position, in the photodetecting surface, of the selected phase difference detection area in the deviation direction, and determines exposure conditions on the basis of output signals of the selected phase difference detection pixels.

The invention also provides an exposure determining method that uses an imaging device having a photodetecting surface in which plural imaging pixels and plural phase difference detection pixels are arranged, wherein the plural imaging pixels detect an image formed by a light beam that passes through a pupil region of an imaging optical system, the plural phase difference detection pixels include plural first phase difference detection pixels that detect one of a pair of images formed by a pair of light beams that pass through different portions of the pupil region of the imaging optical system and plural second phase difference detection pixels that detect the other of the pair of images, and plural phase difference detection areas are arranged in the photo-detecting surface of the imaging device in a deviation direction of the pair of images, plural pairs of a first phase difference detection pixel and a second phase difference detection pixel being arranged in each of the plural phase difference detection areas, the exposure determining method comprising an exposure determining step of determining exposure conditions on the basis of output signals of phase difference detection pixels existing in a selected one of the plural phase difference detection areas; and a defocus amount calculating step of calculating a defocus amount using output signals of the first phase difference detection pixels and the second phase difference detection pixels existing in the selected phase difference detection area that are part of a shot image signal produced by shooting that is performed by the imaging device under the determined exposure conditions, wherein the exposure determining step selects phase difference detection pixels from the selected phase difference detection area according to a sensitivity difference between phase difference detection pixels that exhibit a highest sensitivity in the selected phase difference detection area and phase difference detection pixels that exhibit a lowest sensitivity in the selected phase difference detection area or a position, in the photodetecting surface, of the selected phase difference detection area in the deviation direction, and determines exposure conditions on the basis of output signals of the selected phase difference detection pixels.

Advantages of the Invention

The invention can provide an imaging apparatus and an exposure determining method that enable proper exposure of phase difference detection pixels and thereby make it possible to perform phase difference autofocusing with high accuracy.

DESCRIPTION OF SYMBOLS

5: Solid-state imaging device
11: System control unit
19: Defocus amount calculation unit
50: Photodetecting surface
51: Pixel
52: AF area (phase difference detection area)
51R, 51L: Phase difference detection pixels
X: Row direction (deviation direction of a pair of images)
Y: Column direction

MODES FOR CARRYING OUT THE INVENTION

An embodiment of the present invention will be hereinafter described with reference to the drawings.

Figure 1:
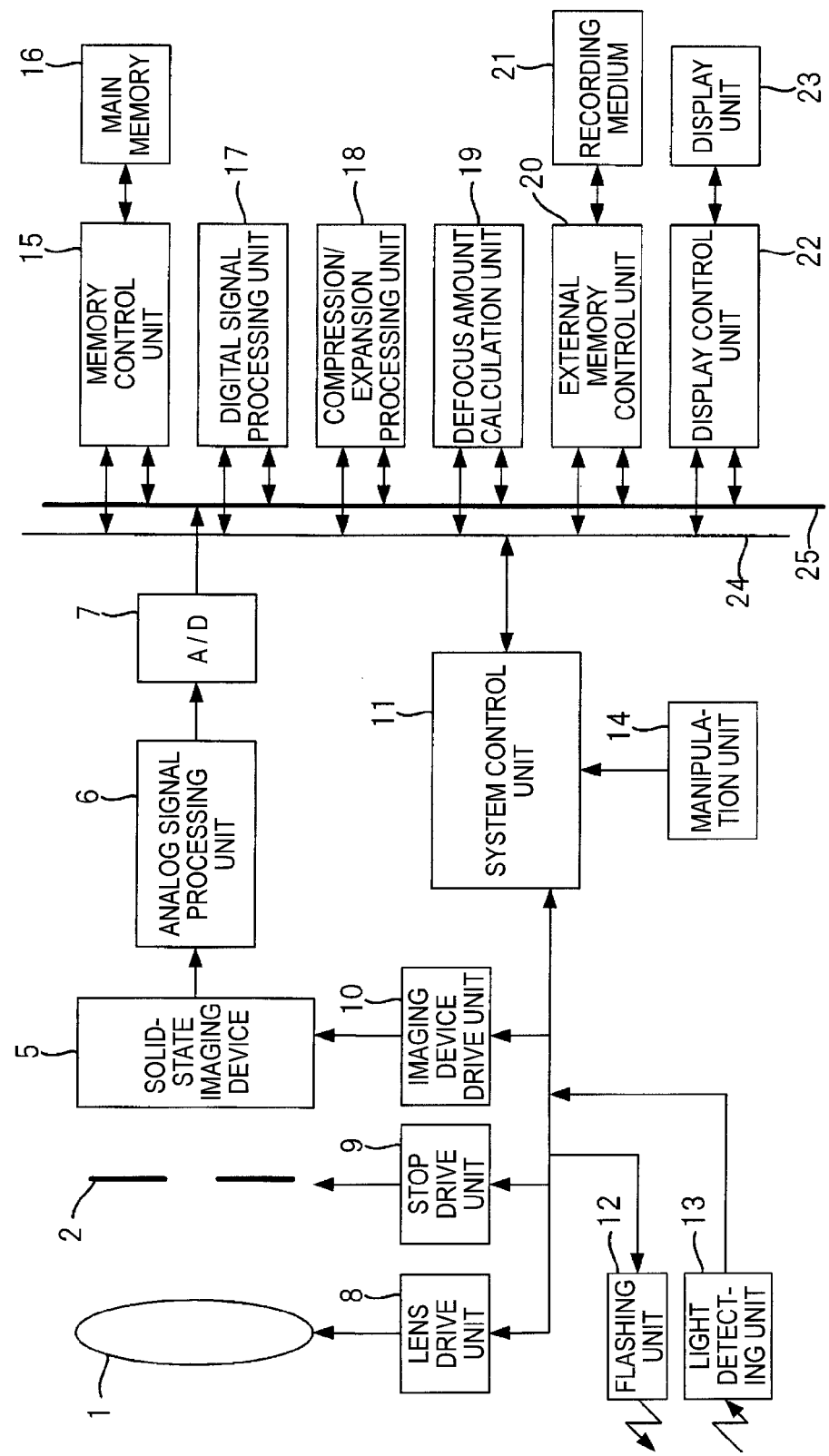
FIG. 1 is a block diagram showing a general configuration of a digital camera according to an embodiment of the present invention which is an example imaging apparatus.

FIG. 1 is a block diagram showing a general configuration of a digital camera according to the embodiment of the invention which is an example imaging apparatus.

An imaging system of the digital camera shown in FIG. 1 is equipped with a lens device (a shooting lens 1 and a stop 2 are included) which serves as an imaging optical system and a CCD, CMOS, or like solid-state imaging device 5.

The lens device which includes the shooting lens 1 and the stop 2 is detachable from or is fixed to the camera body.

A system control unit 11 which supervises the overall electrical control system of the digital camera controls a flashing unit 12 and a light detecting unit 13. The system control unit 11 adjusts the positions of a focus lens and a zoom lens that are included in the shooting lens 1 by controlling a lens drive unit 8. Furthermore, the system control unit 11 adjusts the exposure amount by controlling the aperture of the stop 2 via a stop drive unit 9.

Still further, the system control unit 11 drives the solid-state imaging device 5 via an imaging device drive unit 10 and thereby causes the solid-state imaging device 5 to output, in the form of a shot image signal, a subject image taken through the shooting lens 1. An instruction signal from a user is input to the system control unit 11 through a manipulation unit 14.

The electrical control system of the digital camera is also equipped with an analog signal processing unit 6 which is connected to the output of the solid-state imaging device 5 and performs analog signal processing such as correlation double sampling processing and an A/D conversion circuit 7 which converts an analog signal that is output from the analog signal processing unit 6 into a digital signal. The analog signal processing unit 6 and the A/D conversion circuit 7 are controlled by the system control unit 11. The analog signal processing unit 6 and the A/D conversion circuit 7 may be incorporated in the solid-state imaging device 5.

The electrical control system of the digital camera is further equipped with a main memory 16, a memory control unit 15 which is connected to the main memory 16, a digital signal processing unit 17 which generates shot image data by performing interpolation calculation, gamma correction calculation, RGB/YC conversion processing, etc. on a shot image signal that is output from the A/D conversion circuit 7, a compression/expansion processing unit 18 which compresses shot image data generated by the digital signal processing unit 17 into JPEG data and expands compressed image data, a defocus amount calculation unit 19 which calculates a defocus amount, an external memory control unit 20 to which a detachable recording medium 21 is connected, and a display control unit 22 to which a display unit 23 is connected which is installed on the camera back side, for example. The memory control unit 15, digital signal processing unit 17, compression/expansion processing unit 18, defocus amount calculation unit 19, external memory control unit 20, and display control unit 22 are connected to each other by a control bus 24 and a data bus 25 and controlled according to instructions from the system control unit 11.

Figure 2:
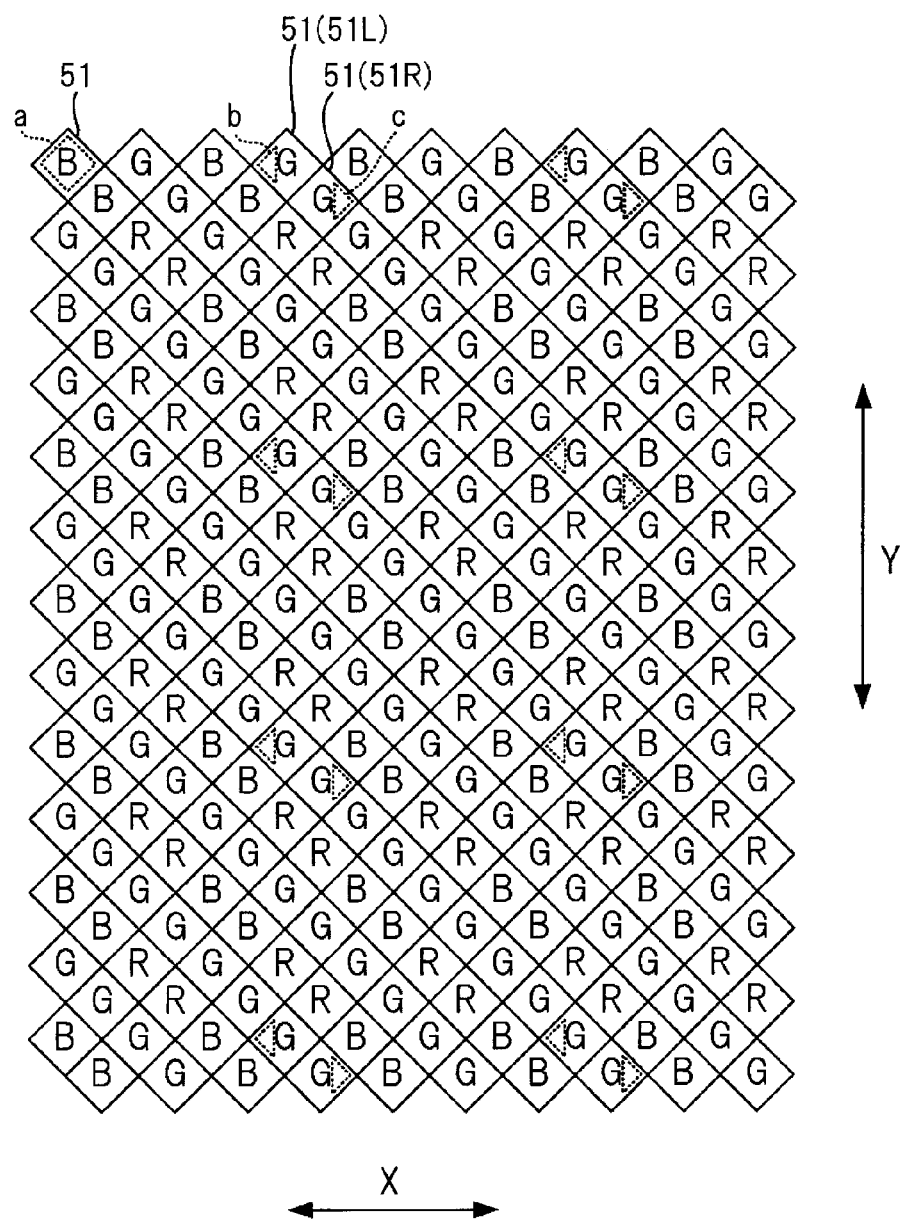
FIG. 2 is an enlarged view of part of a solid-state imaging device 5 installed in the digital camera shown in FIG. 1 and shows its planar configuration.

FIG. 2 is an enlarged view of part of the solid-state imaging device 5 installed in the digital camera and shows its planar configuration.

The solid-state imaging device 5 has a large number of pixels 51 (square blocks in FIG. 2) which are arranged two-dimensionally, that is, in a row direction X and a column direction Y which is perpendicular to the row direction X. Not all of the pixels 51 are shown in FIG. 2; actually, about several millions to about several tens of millions of pixels 51 are arranged two-dimensionally. When shooting is performed by the solid-state imaging device 5, output signals are produced from the large number of pixels 51, respectively. In this specification, a collection of these large number of output signals is referred to as a "shot image signal."

Each pixel 51 includes a photoelectric conversion portion such as a photodiode and a color filter that is formed over the photoelectric conversion portion.

In FIG. 2, each pixel 51 including a color filter that transmits red light is given a character "R," each pixel 51 including a color filter that transmits green light is given a character "G," and each pixel 51 including a color filter that transmits blue light is given a character "B."

The large number of pixels 51 constitute an array in which plural pixel rows in each of which plural pixels 51 are arranged in the row direction X are arranged in the column direction Y. The odd-numbered pixel rows are deviated from the even-numbered pixel rows in the row direction X by approximately half of the arrangement pitch of the pixels 51 of each pixel row.

The color filters included in the pixels 51 of the odd-numbered pixel rows are Bayer-arranged as a whole, and the color filters included in the pixels 51 of the even-numbered pixel rows are also Bayer-arranged as a whole. Each pixel 51 of each odd-numbered pixel row and the pixel 51 that is adjacent to and is located on the bottom-right of it and serves to detect light of the same color as it constitute a pixel pair.

With the solid-state imaging device 5 having the above-described pixel arrangement, the sensitivity of the camera can be increased by adding together output signals of each such pair of pixels 51. Furthermore, the dynamic range of the camera can be increased by changing the exposure times of each pair of pixels 51 and adding their output signals together.

In the solid-state imaging device 5, part of the large number of pixels 51 are made phase difference detection pixels.

The phase difference detection pixels include plural phase difference detection pixels 51R and plural phase difference detection pixels 51L.

The plural phase difference detection pixels 51R receive one of a pair of light beams that have passed through different portions of the pupil area of the shooting lens 1 (e.g., a light beam that has passed through the right half of the pupil area) and output signals corresponding to received light quantities. That is, the plural phase difference detection pixels 51R of the solid-state imaging device 5 serve to detect an image that is formed by one of a pair of light beams that have passed through different portions of the pupil area of the shooting lens 1.

The plural phase difference detection pixels 51L receive the other of the above-mentioned pair of light beams (e.g., a light beam that has passed through the left half of the pupil area) and output signals corresponding to received light quantities. That is, the plural phase difference detection pixels 51L of the solid-state imaging device 5 serve to detect an image that is formed by the other of the pair of light beams that have passed through the different portions of the pupil area of the shooting lens 1. The terms "right" and "left" as used above mean directions to a photographer who is taking an image using the digital camera.

The plural pixels 51 (hereinafter referred to as "imaging pixels") other than the phase difference detection pixels 51R and 51L serve to detect an image that is formed by a light beam that has passed through almost all of the pupil area of the shooting lens 1.

A light shield film is formed over the photoelectric conversion portions of the respective pixels 51, and openings that define photodetection areas of the photoelectric conversion portions are formed through the light shield film.

The center of the opening (indicated by symbol a in FIG. 2) of each imaging pixel 51 coincides with the center of the photoelectric conversion portion of the imaging pixel 51 (the center of the square block). In FIG. 2, to simplify it, an opening a is shown for only one imaging pixel 51.

In contrast, the center of the opening (indicated by symbol c in FIG. 2) of each phase difference detection pixel 51R is deviated rightward from the center of the photoelectric conversion portion of the phase difference detection pixel 51R.

The center of the opening (indicated by symbol b in FIG. 2) of each phase difference detection pixel 51L is deviated leftward from the center of the photoelectric conversion portion of the phase difference detection pixel 51L.

In the solid-state imaging device 5, part of the pixels 51 having a green color filter are made the phase difference detection pixels 51R and the phase difference detection pixels 51L. Naturally, part of the pixels 51 having a color filter of another color may be made phase difference detection pixels.

The phase difference detection pixels 51R are arranged discretely and periodically in the area where the pixels 51 are arranged. The phase difference detection pixels 51L are also arranged in the same manner.

In the example of FIG. 2, the phase difference detection pixels 51R are arranged every four pixels in the row direction X in part of the even-numbered pixel rows (in FIG. 2, four pixel rows arranged every four pixel rows).

In the example of FIG. 2, the phase difference detection pixels 51L are arranged at the same cycle as the phase difference detection pixels 51R in the row direction X in part of the odd-numbered pixel rows (i.e., in the pixel rows adjacent to the respective pixel rows that include phase difference detection pixels 51R).

With the above structure, the light that is received by each pixel 51L past the opening b of the light shield film is mainly light that has passed through the left-hand part (as viewed from a subject) of the shooting lens 1 which is disposed over the paper surface of FIG. 2, that is, light that comes from such a direction that the subject is seen by the right eye. The light that is received by each pixel 51R past the opening c of the light shield film is mainly light that has passed through the right-hand part (as viewed from the subject) of the shooting lens 1, that is, light that comes from such a direction that the subject is seen by the left eye.

That is, every phase difference detection pixel 51R can produce a shot image signal in the same manner as the subject is seen by the left eye and every phase difference detection pixel 51L can produce a shot image signal in the same manner as the subject is seen by the right eye. Therefore, phase difference information can be obtained by performing a correlation calculation on a combination of those signals.

The phase difference detection pixels 51R and the phase difference detection pixels 51L can produce phase difference information because the openings in the light shield film of the former and those of the latter are deviated in the opposite directions. However, the structure for producing phase difference information is not limited to it and any of well-known structures may be employed.

Figure 3:
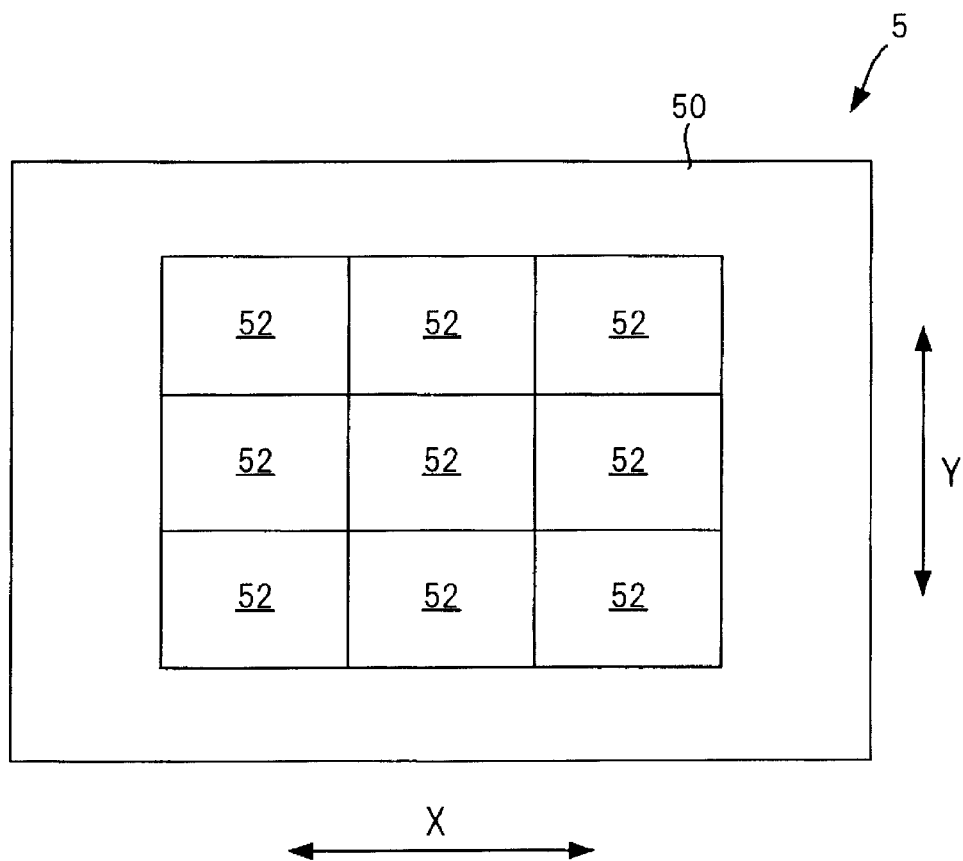
FIG. 3 is a schematic plan view showing the overall configuration of the solid-state imaging device 5 of the digital camera shown in FIG. 1.

FIG. 3 is a schematic plan view showing the overall configuration of the solid-state imaging device 5 installed in the digital camera shown in FIG. 1.

The solid-state imaging device 5 has a photodetecting surface 50 in which all of the pixels 51 are arranged. In the example of FIG. 2, the photodetecting surface 50 is provided with nine phase difference detection areas (hereinafter referred to as "AF areas") 52 for acquisition of phase difference information.

Each AF area 52 is an area that includes plural pairs of a phase difference detection pixel 51L and a phase difference detection pixel 51R that are located close to each other (see FIG. 2). Only imaging pixels 51 are disposed in the area, excluding the AF areas 52, of the photodetecting surface 50.

Among the nine AF areas 52 shown in FIG. 2, the three AF areas 52 located at the center in the row direction X are areas each of which spans both sides of a straight line that passes the point where the optical axis of the imaging optical system intersects the photodetecting surface 50 and extends in the column direction Y and hence has a certain width in the row direction X. In other words, the three AF areas 52 located at the center in the row direction X are areas each of which spans both sides of the center line (intersecting the optical axis) of the photodetecting surface 50 in the row direction X.

The defocus amount calculation unit 19 shown in FIG. 1 calculates a phase difference amount that is a relative positional deviation between two respective images formed by a pair of light beams (described above) using output signals that are read out of the phase difference detection pixels 51L and the phase difference detection pixels 51R existing in one, selected by a user manipulation or the like, of the nine AF areas 52. Based on the calculated phase difference amount, the defocus amount calculation unit 19 determines a focus adjusting state of the shooting lens 1 which is, in the embodiment, an amount of deviation from a focused state and its direction, that is, a defocus amount.

The system control unit 11 shown in FIG. 1 controls the focusing of the shooting lens 1 by moving the focusing lens of the shooting lens 1 to a focus position on the basis of the defocus amount calculated by the defocus amount calculation unit 19.

The openings of the phase difference detection pixels 51R and those of the phase difference detection pixels 51L are deviated in opposite directions. As a result, a phase difference detection pixels 51R and a phase difference detection pixel 51L have a sensitivity difference even if they are deviated by approximately the same distance in the deviation direction (row direction X in FIG. 2).

Figure 4:
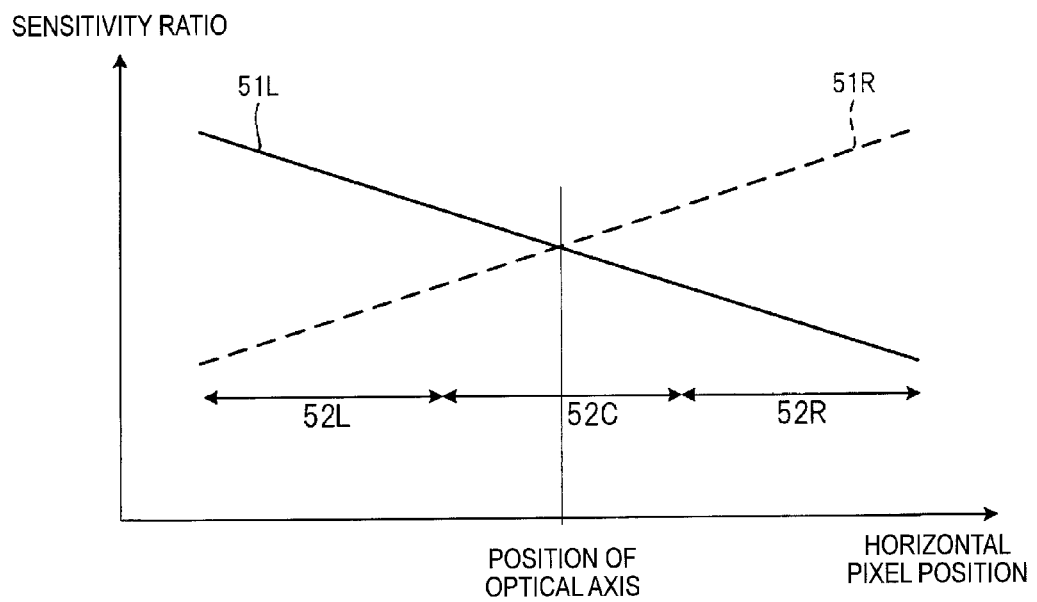
FIG. 4 is a graph showing relationships between the sensitivity ratios of phase difference detection pixels 51R and 51L and the position in the row direction X (horizontal pixel position) on a solid-state imaging device 5.

FIG. 4 is a graph showing relationships between the sensitivity ratios of the phase difference detection pixels 51R and 51L and the position in the row direction X (horizontal pixel position) on the solid-state imaging device 5. The straight line denoted by symbol 51R represents the sensitivity ratio of the phase difference detection pixel 51R and the straight line denoted by symbol 51L represents the sensitivity ratio of the phase difference detection pixel 51L.

In FIG. 4, reference symbols 52L, 52C, and 52R indicate horizontal pixel position ranges of the three left-hand AF areas 52, the three central AF areas 52, and the three right-hand AF areas 52 shown in FIG. 3, respectively.

The sensitivity ratio of a phase difference detection pixel means the ratio A/B or B/A between an output signal A of the phase difference detection pixel and an output signal A of an imaging pixel (for detecting light of the same color as the phase difference detection pixel does) close to it. In this specification, the term "two pixels close to each other" means two pixels that are so close to each other as to be able to be regarded as detecting light beams that coming from substantially the same portion of a subject. FIG. 4 employs sensitivity ratios A/B.

The phase difference detection pixels 51R and 51L are also arranged periodically in the column direction Y. However, since the openings of the phase difference detection pixels 51R and 51L are not deviated in the column direction Y, they exhibit the same sensitivity ratio curves as shown in FIG. 4 at any position in the column direction Y.

A sensitivity distribution of plural phase difference detection pixels 51R or plural phase difference detection pixels 51L cannot be obtained from their output signals alone because signal levels in the row direction X vary from one subject to another. In contrast, a sensitivity distribution of phase difference detection pixels 51R or phase difference detection pixels 51L can be obtained by calculating sensitivity ratios, that is, ratios between output signals of the phase difference detection pixels 51R or the phase difference detection pixels 51L and output signals of respective imaging pixels 51 close to them.

Although in a strict sense the phase difference detection pixels 51R and the phase difference detection pixels 51L do not share the same positions in the row direction X, FIG. 4 is drawn in such a manner that the phase difference detection pixels 51R and the phase difference detection pixels 51L share the same positions in the row direction X.

Figure 5:
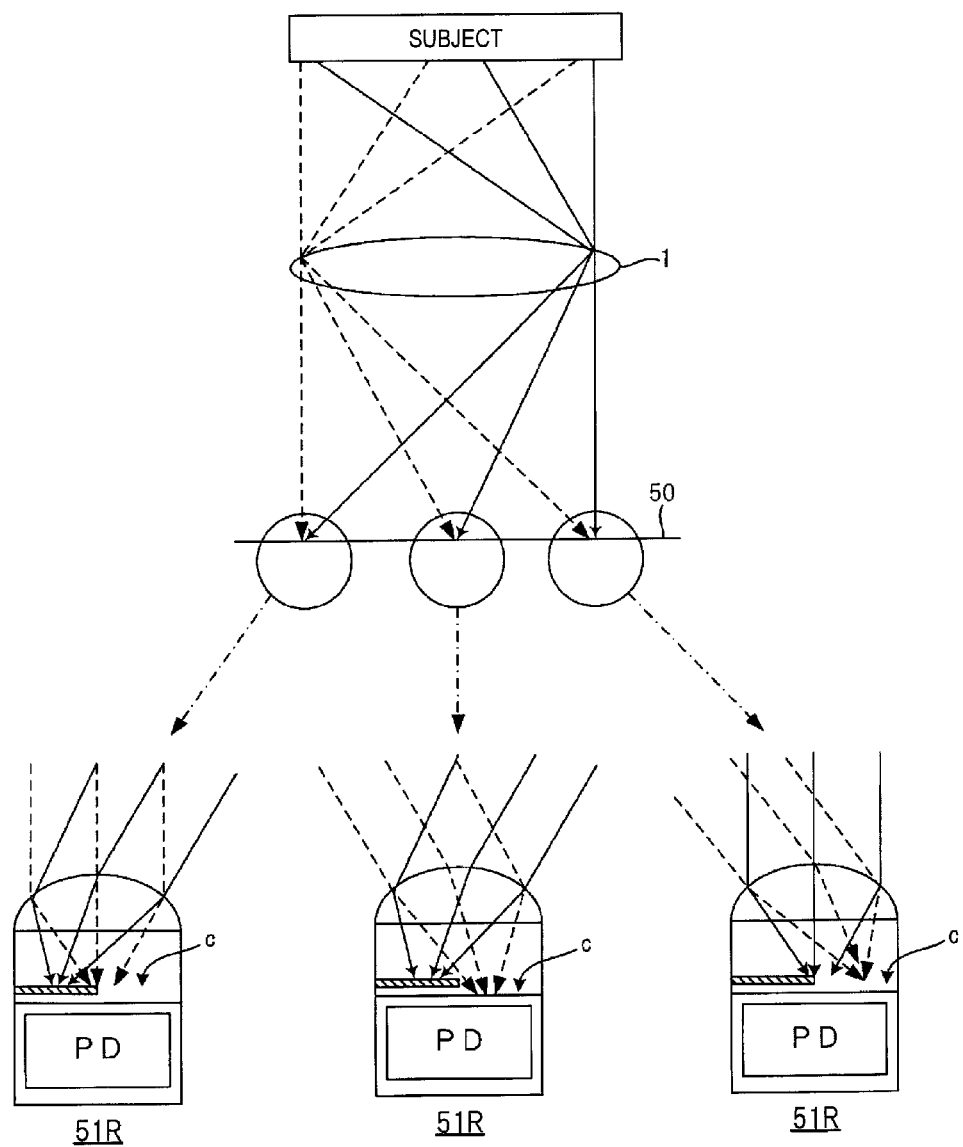
FIG. 5 illustrates why the sensitivity ratio characteristics occur.

The openings c of the phase difference detection pixels 51R are deviated rightward in FIG. 2. Therefore, as shown in FIG. 5, the opening c of a phase difference detection pixel 51R that is located in a left end portion of the photodetecting surface 50 receives half of light that has passed through a left-hand part of the imaging lens 1 but receives none of light that has passed through a right-hand part of the imaging lens 1. On the other hand, the opening c of a phase difference detection pixel 51R that is located in a right end portion of the photodetecting surface 50 receives half of light that has passed through a right-hand part of the imaging lens 1 and receives all of light that has passed through a left-hand part of the imaging lens 1. The opening c of a phase difference detection pixel 51R that is located in a central portion of the photodetecting surface 50 receives light that has passed through a left-hand part of the imaging lens 1 but receives none of light that has passed through a right-hand part of the imaging lens 1.

The openings b of the phase difference detection pixels 51L are deviated in the opposite direction in the row direction X to the openings c of the phase difference detection pixels 51R. Therefore, the sensitivity ratio characteristic of the phase difference detection pixels 51L is opposite to that of the phase difference detection pixels 51R.

Therefore, as shown in FIG. 4, the sensitivity ratio of the phase difference detection pixel 51L becomes smaller as its position goes from the left end to the right end on the solid-state imaging device 5. And the sensitivity ratio of the phase difference detection pixel 51R becomes larger as its position goes from the left end to the right end on the solid-state imaging device 5.

Around the central line in the row direction X on the photodetecting surface 50 (i.e., the straight line of the photodetecting surface 50 that intersects the optical axis of the imaging optical system and extends in the column direction Y), light is incident on the solid-state imaging device 5 approximately perpendicularly when viewed from the row direction X and hence the sensitivity ratio of the phase difference detection pixels 51L is approximately equal to that of the phase difference detection pixel 51R.

In the digital camera shown in FIG. 1, so that output signal levels of the phase difference detection pixels 51R and 51L to be used for calculation of a phase difference amount have values that are suitable for the defocus amount calculation unit 19 to obtain a correct defocus amount, the system control unit 11 determines exposure conditions (aperture, shutter speed, etc.) so that the phase difference detection pixels 51R and 51L existing in a selected AF area 52 are given proper exposure amounts.

As shown in FIG. 4, the sensitivity ratio curves vary depending on the position of the AF area 52 in the row direction X. Therefore, the algorithm for determining exposure conditions are changed according to the position of a selected AF area 52 row direction X.

For example, in the three left-hand AF areas 52, among the phase difference detection pixels 51R and 51L existing in each of these left-hand AF areas 52, phase difference detection pixels 51L located at the left end exhibit a highest sensitivity.

Therefore, if one of the three left-hand AF areas 52 (see FIG. 3) is selected, the system control unit 11 selects the phase difference detection pixels 51L that exhibit a highest sensitivity in the selected AF area 52 and determines, on the basis of output signals of the selected phase difference detection pixels 51L, exposure conditions so that the selected phase difference detection pixels 51L are given proper exposure amounts.

Among the phase difference detection pixels 51R and 51L existing in the range 52L shown in FIG. 4, the phase difference detection pixels 51L located at the left end exhibit a highest sensitivity. By determining exposure conditions so that phase difference detection pixels 51L exhibiting the highest sensitivity are given proper exposure amounts, the output signals of all of the phase difference detection pixels 51R and 51L existing in the range 52L can be prevented from reaching a saturation level. This in turn makes it possible to calculate a phase difference amount correctly using output signals of the phase difference detection pixels 51R and 51L existing in the selected AF area 52.

Likewise, if one of the three right-hand AF areas 52 (see FIG. 3) is selected, the system control unit 11 selects phase difference detection pixels 51R that exhibit a highest sensitivity in the selected AF area 52 and determines, on the basis of output signals of the selected phase difference detection pixels 51R, exposure conditions so that the selected phase difference detection pixels 51R are given proper exposure amounts.

On the other hand, if one of the three central AF areas 52 (see FIG. 3) is selected, the system control unit 11 selects phase difference detection pixels 51R or 51L whose sensitivities coincide with an average of sensitivities of all of the phase difference detection pixels 51R and 51L existing in the selected AF area 52, that is, phase difference detection pixels 51R or 51L that exhibit a sensitivity ratio at the position where the two straight lines cross each other in FIG. 4.

Then the system control unit 11 determines, on the basis of output signals of the selected phase difference detection pixels 51R or 51L, exposure conditions so that the selected phase difference detection pixels 51R or 51L are given proper exposure amounts. The exposure conditions mainly mean the exposure time, but sometimes the F value is changed. The system control unit 11 adjusts the exposure time, in some cases, the F value, so that the output signals of the selected phase difference detection pixels 51R or 51L fall within a predetermined range.

If the optical conditions of the imaging optical system (the combination of the F value, the focal length, and the focus lens position) are changed, the incident angles of light beams incident on the solid-state imaging device 5 change. As a result, the slopes of the straight lines in FIG. 4 which represent the sensitivity ratio characteristics of the phase difference detection pixels 51R and 51L vary depending on the optical conditions of the imaging optical system.

In the range 52C, the sensitivity difference between the phase difference detection pixels exhibiting a highest sensitivity and the phase difference detection pixels exhibiting a lowest sensitivity is smaller than in the ranges 52L and 52R. Although as described above this sensitivity difference increases or decreases depending on the optical conditions of the imaging optical system, the sensitivity difference in the range 52C is kept smaller than in the ranges 52L and 52R.

The fact that the sensitivity difference in a certain range is small means that the difference between an average of sensitivities of all of the phase difference detection pixels existing in that range and a maximum sensitivity obtained in the same range is small.

Therefore, in an AF area 52 belonging to a range with a small sensitivity difference (in the example of FIG. 4, range 52C), even if exposure conditions are selected so that phase difference detection pixels whose sensitivities coincide with an average of sensitivities of all of the phase difference detection pixels existing in that AF area 52 are given proper exposure amounts, the probability is low that phase difference detection pixels that exhibit a highest sensitivity in the AF area are saturated.

Therefore, if an AF area 52 in the range 52C is selected, the system control unit 11 selects phase difference detection pixels whose sensitivities coincide with an average of sensitivities of all of the phase difference detection pixels existing in the selected AF area 52 and determines exposure conditions so that the selected AF area 52 are given proper exposure amounts.

With this measure, the exposure amounts of phase difference detection pixels 51R and 51L used can be made larger than in a case that an AF area in the range 52R or 52L is selected, as a result of which the S/N ratio can be increased and the accuracy of calculation of a phase difference amount can be made higher.

Ordinarily, shooting is done with a major subject placed at the center of the shooting range. Therefore, by determining exposure conditions in the above-described manner when an AF area 52 in the range 52C is selected, the accuracy of phase difference autofocusing can be increased in most shooting events by preventing saturation while increasing the exposure amounts of the phase difference detection pixels.

When shooting is done with focusing made on a subject placed at an end position of the shooting range, the exposure amounts of phase difference detection pixels used cannot be set very high. However, phase difference detection pixels used can be prevented reliably from being saturated and hence reduction of the accuracy of phase difference autofocusing can be prevented.

How the above-configured digital camera operates will be described below.

Figure 6:
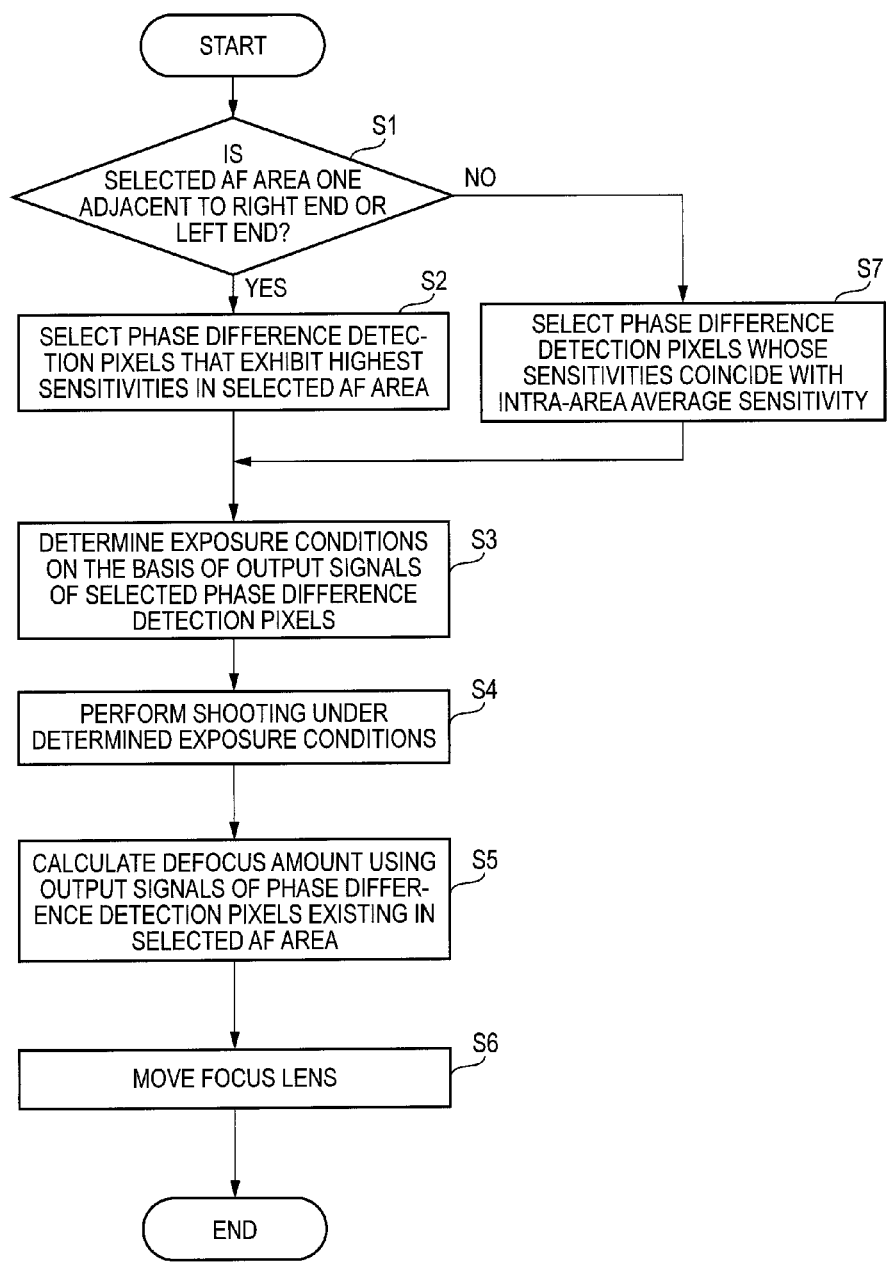
FIG. 6 is a flowchart showing an operation of the digital camera shown in FIG. 1.

FIG. 6 is a flowchart showing how the digital camera shown in FIG. 1 operates after receiving an AF command.

When a shooting mode is set and an AF command is given by, for example, a half depression of the shutter button, at step S1 the system control unit 11 judges a position of an AF area 52 that was selected in advance.

If the selected AF area 52 is an AF area 52 adjacent to the right end or the left end in the row direction X (step S1: yes), at step S2 the system control unit 11 selects phase difference detection pixels that exhibit a highest sensitivity in the selected AF area 52.

If the selected AF area 52 is an AF area adjacent to the left end, the phase difference detection pixels that exhibit a highest sensitivity are leftmost phase difference detection pixels 51L among all of the phase difference detection pixels 51L exiting in the selected AF area 52. If the selected AF area 52 is an AF area adjacent to the right end, the phase difference detection pixels that exhibit a highest sensitivity are rightmost phase difference detection pixels 51R among all of the phase difference detection pixels 51R exiting in the selected AF area 52. Since the positions of phase difference detection pixels that exhibit a highest sensitivity in each AF area 52 are determined in advance by the position of the AF area 52 on the solid-state imaging device 5 and the arrangement of the phase difference detection pixels, they can be stored in a memory in advance.

If the selected AF area 52 is an AF area located at the center in the row direction X (step S1: no), at step S7 the system control unit 11 selects phase difference detection pixels whose sensitivities coincide with an average of sensitivities of all of the phase difference detection pixels existing in the selected AF area 52 (hereinafter referred to as an "intra-area average sensitivity").

The phase difference detection pixels whose sensitivities coincide with an average of sensitivities of all of the phase difference detection pixels existing in each of the central AF area 52 are ones located at a position in the row direction X that corresponds to the position where the two straight lines representing the sensitivity ratio characteristics cross each other in the data shown in FIG. 4. Therefore, a coordinate of this position is determined from the data shown in FIG. 4 and stored in advance.

After the execution of step S2 or S7, at step S3 the system control unit 11 acquires output signals of the selected phase difference detection pixels and determines exposure conditions on the basis of the acquired output signals.

Upon determining exposure conditions, at step S4 the system control unit 11 causes the solid-state imaging device 5 to perform shooting under the determined exposure conditions. A resulting shot image signal that is output from the solid-state imaging device 5 is stored in the main memory 16.

At step S5, the defocus amount calculation unit 19 calculates a phase difference amount by performing a correlation calculation using part of the shot image signal stored in the main memory 16, that is, output signals of the phase difference detection pixels 51R and 51L existing in the selected AF area 52 and calculates a defocus amount on the basis of the calculated phase difference amount. During that course, a live view image may be generated and displayed using another part of the shot image signal produced by the shooting at step S4 output signals of the imaging pixels 51.

After the execution of step S5, at step S6 the system control unit 11 performs a focusing control for moving the focus lens to a focus position on the basis of the defocus amount calculated at step S5. Then, a shooting standby state is established.

As described above, in the digital camera shown in FIG. 1, reference phase difference detection pixels for determination of exposure conditions are determined according to a position of a selected AF area 52. As a result, a phase difference amount can be calculated more correctly than in, for example, a case that exposure conditions are determined on the basis of output signals of all of the phase difference detection pixels existing in a selected AF area 52.

Even if phase difference detection pixels whose sensitivities coincide with an intra-area average sensitivity are selected at step S7 (see FIG. 5) and shooting is performed by determining exposure conditions on the basis of output signals of the thus-selected phase difference detection pixels, there may occur an event that output signals of phase difference detection pixels located at end portions of the range 52C are saturated because the slopes of straight lines representing sensitivity ratio characteristics are too steep due to performance of the imaging optical system and optical conditions of the imaging optical system. The accuracy of calculation of a phase difference amount lowers in a state that output signals of phase difference detection pixels located at end portions of the range 52C are saturated An operation for preventing such reduction of the accuracy of calculation of a phase difference amount is shown in FIG. 7.

Figure 7:
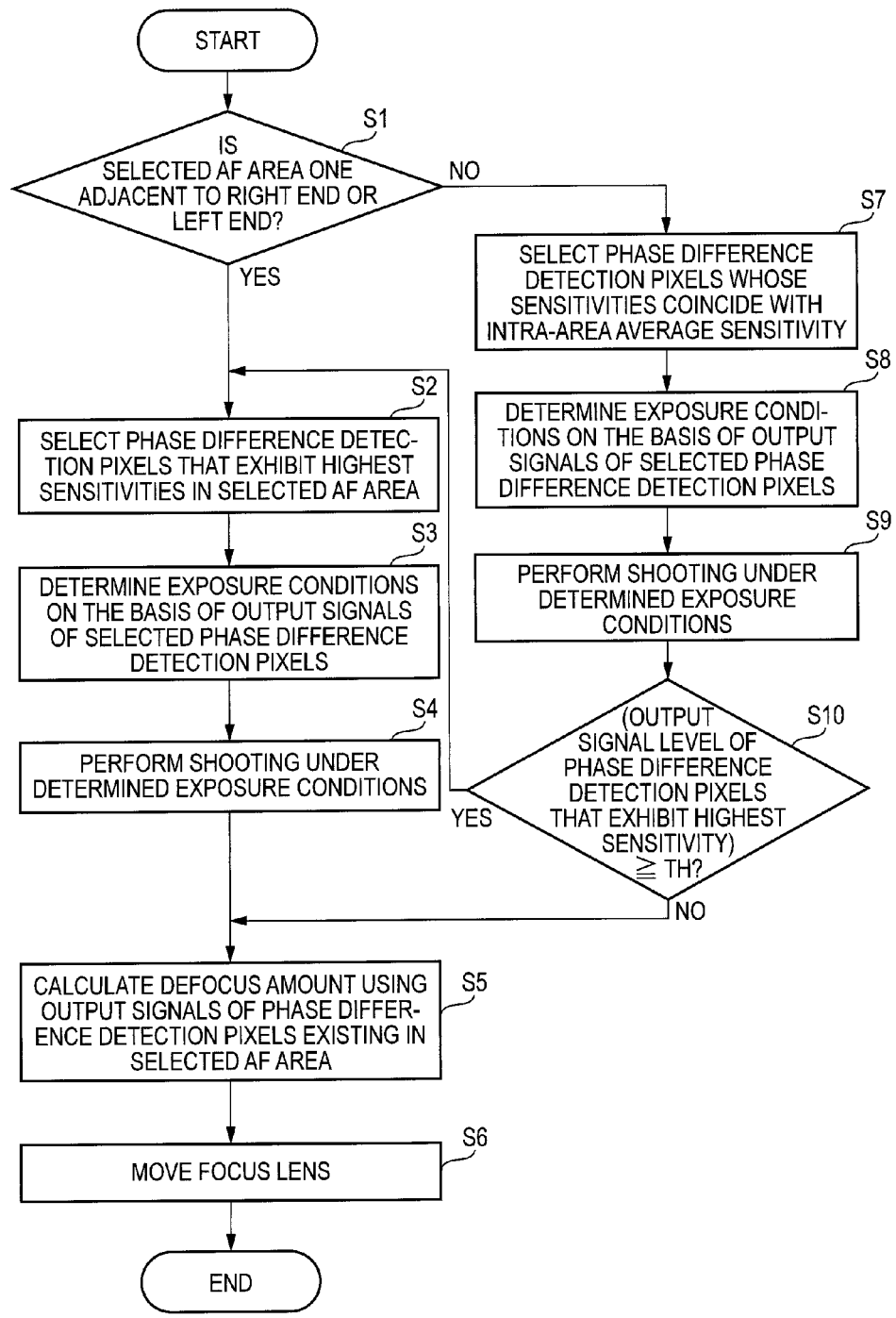
FIG. 7 is a flowchart showing a modified version of an operation of the digital camera shown in FIG. 1.

FIG. 7 is a flowchart showing how the digital camera shown in FIG. 1 operates after receiving an AF command (modified operation). In FIG. 7, steps having the same ones in FIG. 6 are given the same reference symbols as the latter.

The steps that are executed if the judgment result of step S1 is affirmative are the same as in the operation of FIG. 6. If the judgment result of step S1 is negative, after the execution of step S7, at step S8 the system control unit 11 determines exposure conditions on the basis of output signals of the phase difference detection pixels selected at step S7.

Upon determining exposure conditions, at step S9 the system control unit 11 causes the solid-state imaging device 5 to perform shooting under the determined exposure conditions. A resulting shot image signal that is output from the solid-state imaging device 5 is stored in the main memory 16.

After the execution of step S9, the system control unit 11 acquires part of the shot image signal, that is, output signals of phase difference detection pixels exhibiting highest sensitivities in the selected AF area 52 (i.e., phase difference detection pixels 51L adjacent to the left end of the range 52C and phase difference detection pixels 51R adjacent to the right end of the range 52C). At step S10, the system control unit 11 judges whether an average of the levels of output signals of the phase difference detection pixels 51L adjacent to the left end of the range 52C or an average of the levels of output signals of the phase difference detection pixels 51R adjacent to the right end of the range 52C are larger than or equal to a threshold value TH.

If one of the two averages is larger than or equal to the threshold value TH (step S10: yes), at step S2 selects the system control unit 11 phase difference detection pixels 51L adjacent to the left end of the range 52C and the phase difference detection pixels 51R adjacent to the right end of the range 52C. At step S3, the system control unit 11 determines exposure conditions on the basis of the output signals of the selected phase difference detection pixels. Then step S4 and the steps following it are executed (shooting is performed again).

On the other hand, if both averages are smaller than the threshold value TH (step S10: no), at step S5 the system control unit 11 causes the defocus amount calculation unit 19 to calculate a defocus amount using output signals of the phase difference detection pixels that are part of the shot image signal produced by the shooting at step S9.

The threshold value may be set equal to a saturation level of the phase difference detection pixels 51R and 51L or at a value close to it.

As described above, the modified operation shown in FIG. 7 can prevent the accuracy of phase difference autofocusing from lowering when one of the central AF area 52 is selected (see FIG. 3).

In the above-described operation shown in FIG. 7, if the judgment result of step S10 is affirmative, exposure conditions are determined again and then shooting is performed and a defocus amount is calculated.

However, the operation shown in FIG. 7 may be modified so that if the judgment result of step S10 is affirmative, the defocus amount calculation unit 19 calculates a defocus amount using output signals of phase difference detection pixels other than ones the levels of whose output signals are higher than or equal to the threshold value TH. Calculating a defocus amount in this manner, that is, without using output signals of saturated phase difference detection pixels, can prevent reduction of the accuracy of phase difference autofocusing.

Although FIG. 3 shows the example that three AF areas 52 are arranged in the row direction X, the number of AF areas 52 arranged in the row direction X is not limited to three and may be any plural number. Where plural AF areas 52 are arranged in the row direction X, since they are associated with different pairs of sensitivity ratio curves, phase difference autofocusing can be performed with high accuracy by selecting phase difference detection pixels according to the position of a selected AF area 52 and determining exposure conditions on the basis of output signals of the selected phase difference detection pixels.

Figure 8:
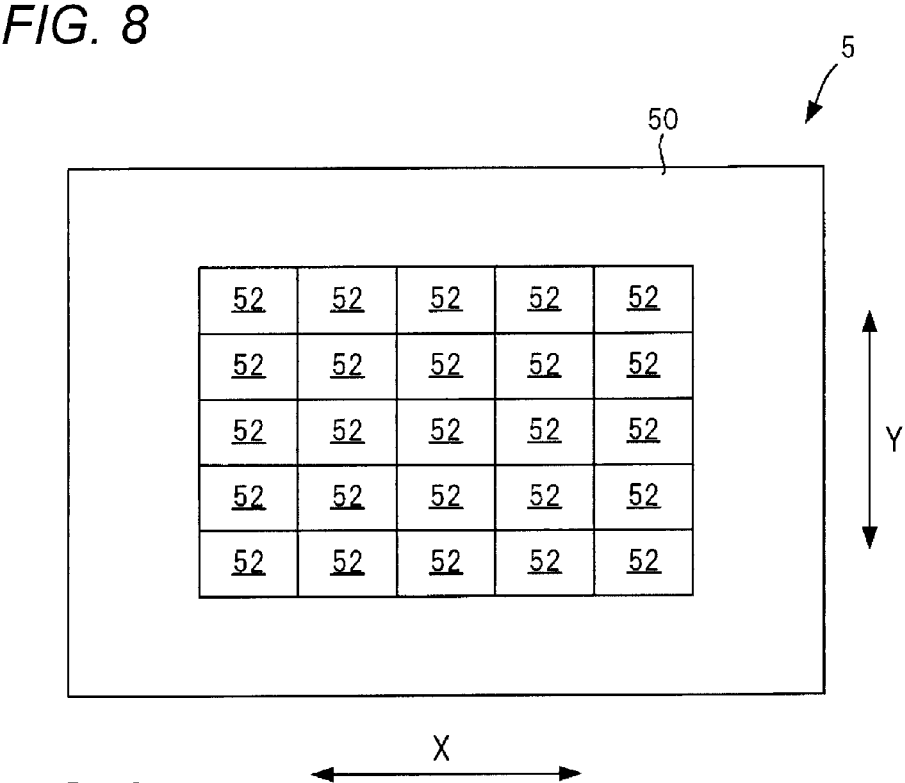
FIG. 8 shows a modified version of AF areas that are set on the solid-state imaging device 5 of the digital camera shown in FIG. 1.

For example, where as shown in FIG. 8 five AF areas 52 are arranged in the row direction X, for the central AF area 52 (which spans both sides of a straight line that passes the point where the optical axis intersects the photodetecting surface 50 and extends in the column direction Y) among the five AF areas 52, exposure conditions are determined in the same manner as for each central AF area 52 shown in FIG. 3.

For the left-end AF area 52 among the five AF areas 52, exposure conditions are determined in the same manner as for each left-hand AF area 52 shown in FIG. 3. For the right-end AF area 52 among the five AF areas 52, exposure conditions are determined in the same manner as for each right-hand AF area 52 shown in FIG. 3.

For each of the second left and second right AF areas 52 among the five AF areas 52, exposure conditions are determined on the basis of output signals of phase difference detection pixels that exhibit a highest sensitivity in the AF area 52.

Although in FIGS. 3 and 8 the AF areas 52 occupy part of the photodetecting surface 50, they may be set so as to occupy the entire photodetecting surface 50.

Although the above description is directed to the case that the pixels 51 are arranged in what is called honeycomb form, the invention can employ a solid-state imaging device in which the pixels 51 are arranged in square lattice form.

Although the above description is directed to the case that the solid-state imaging device 5 incorporates color filters of plural colors and takes a color image, the solid-state imaging device 5 may be one for taking a monochrome image that incorporates monochrome (green) color filters or no color filters.

Although the above description is directed to the digital camera which is an example imaging apparatus, the techniques described in the embodiment can also be applied to a smartphone incorporating a camera.

The sensitivity ratio curves shown in FIG. 4 vary depending on the lens device type. Where a lens device is fixed to a digital camera, it is possible to determine, in advance, for each AF area 52 to be selected, reference phase difference detection pixels for determination of an exposure in the AF area 52.

However, in the case of a digital camera that enables lens device exchange, a proper exposure may not be obtained if exposure conditions are determined on the basis of output signals of phase difference detection pixels that are determined according to the position of a selected AF area 52.

Figure 9:
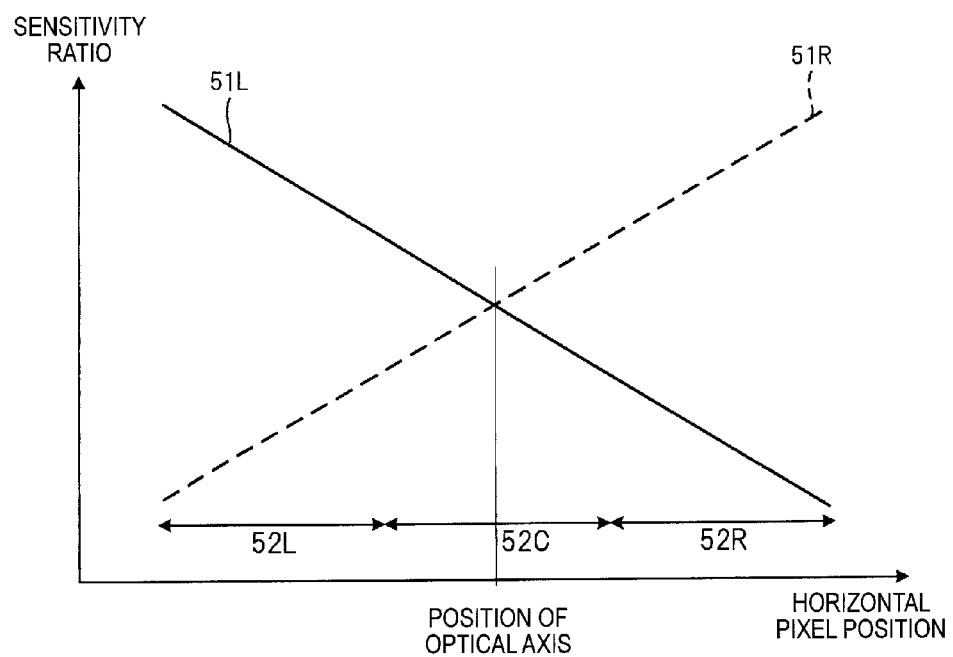
FIG. 9 shows another example of sensitivity ratio curves.

For example, assume that in the digital camera shown in FIG. 1 the imaging optical system has been switched to another one and the sensitivity ratio curves have thereby changed to ones shown in FIG. 9.

In this case, in the range 52C, the sensitivity difference between phase difference detection pixels that exhibit a highest sensitivity and phase difference detection pixels that exhibit a lowest sensitivity is larger than in the example shown in FIG. 4. As a result, when an AF area 52 in the range 52C is selected, even if exposure conditions are determined so that phase difference detection pixels whose sensitivities coincide with an average of sensitivities of all of the phase difference detection pixels existing in the selected AF area 52 are given a proper exposure amount, it is highly probable that phase difference detection pixels that exhibit a highest sensitivity in the selected AF area 52 are saturated.

Figure 10:
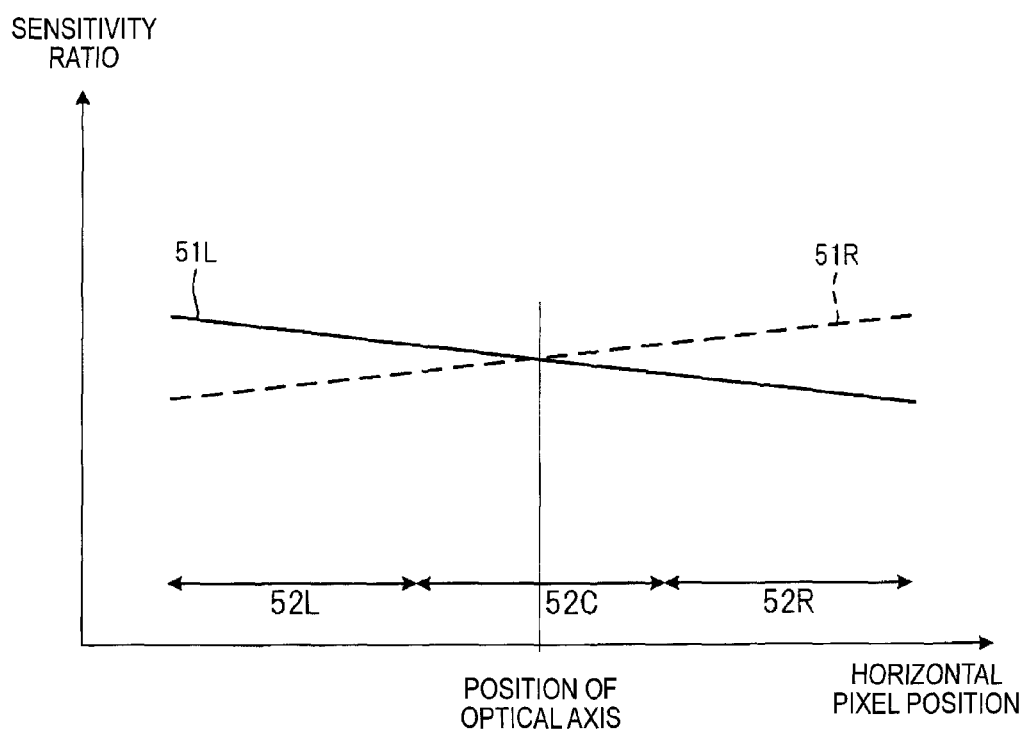
FIG. 10 shows a further example of sensitivity ratio curves.

Assume another case that in the digital camera shown in FIG. 1 the imaging optical system has been switched to another one and the sensitivity ratio curves have thereby changed to ones shown in FIG. 10.

In this case, in the ranges 52L and 52R, the sensitivity difference between phase difference detection pixels that exhibit a highest sensitivity and phase difference detection pixels that exhibit a lowest sensitivity is smaller than in the example shown in FIG. 4. As a result, when an AF area 52 in the range 52L or 52R is selected, even if exposure conditions are determined so that phase difference detection pixels whose sensitivities coincide with an average of sensitivities of all of the phase difference detection pixels existing in the selected AF area 52 are given a proper exposure amount, the probability is low that phase difference detection pixels that exhibit a highest sensitivity in the selected AF area 52 are saturated.

In view of the above, the system control unit 11 calculates a sensitivity difference between phase difference detection pixels that exhibit a highest sensitivity in a selected AF area 52 and phase difference detection pixels that exhibit a lowest sensitivity in the selected AF area 52. Step S7 shown in FIG. 6 is executed if the calculated sensitivity difference has such a value that no phase difference detection pixels are saturated even if exposure conditions are determined by executing step S7. Step S2 shown in FIG. 6 is executed if the calculated sensitivity difference has such a large value that phase difference detection pixels are saturated if exposure conditions are determined by executing step S7.

Sensitivity ratio data like the data shown in FIG. 4, 9, or 10 may be generated for each lens device that can be attached to the digital camera and stored in a memory of the digital camera in advance. Alternatively, such sensitivity ratio data may be generated from, for example, a live view image and stored in a memory when a lens device is attached to the digital camera.

As described above, the system control unit 11 selects phase difference detection pixels existing in a selected AF area 52 according to a sensitivity difference in the selected AF area 52 and determines exposure conditions on the basis of output signals of the selected phase difference detection pixels. This makes it possible to set a proper exposure and thereby prevent reduction of the accuracy of phase difference autofocusing. Even with a fixed lens device, since the sensitivity ratio characteristics vary depending on the shooting conditions, the above-described measure makes it possible to reduction of the accuracy of phase difference autofocusing also in a digital camera with a fixed lens device.

Next, a description will be made of a smartphone 200 incorporating a camera according to another embodiment of the invention which is an example imaging apparatus.

Figure 11:
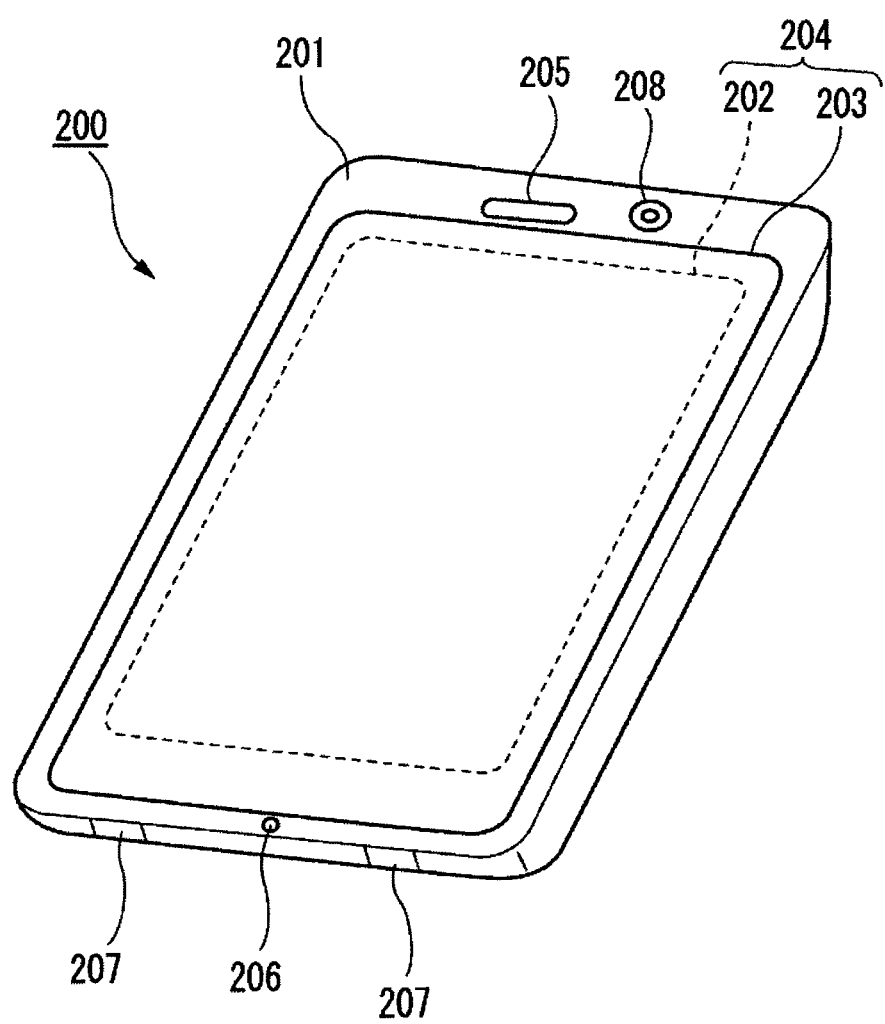
FIG. 11 shows an appearance of a smart phone according to another embodiment of the invention which is another example imaging apparatus.

FIG. 11 shows an appearance of the smartphone 200. The smartphone 200 shown in FIG. 10 has a flat-plate-like body 201 and one surface of the body 201 is provided with a display/input unit 204 which is an integrated unit of a display panel 202 as a display unit and a manipulation panel 203 as an input unit. The body 201 is equipped with a speaker 205, a microphone 206, manipulation members 207, and a camera unit 208. The configuration of the body 201 is not limited to the above; for example, a configuration in which the display unit and the input unit are separated from each other and a configuration having a folding structure or a slide mechanism may be employed.

Figure 12:
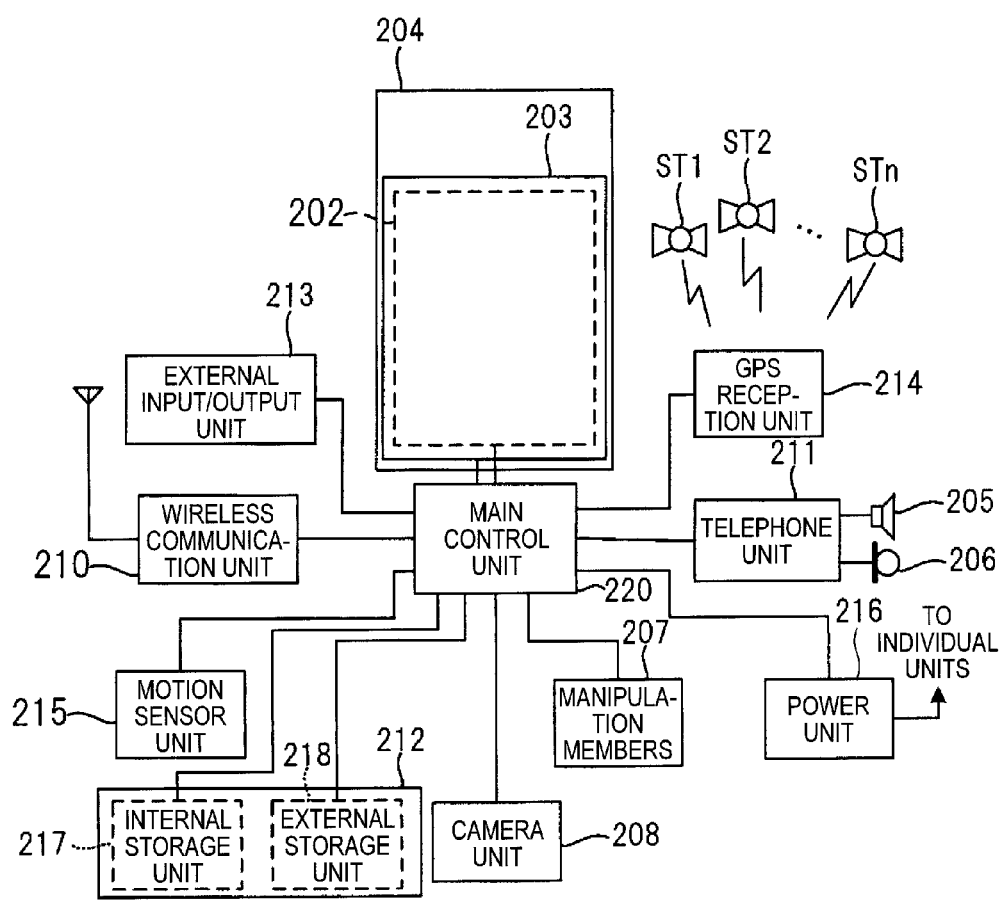
FIG. 12 is a block diagram showing the internal configuration of the smartphone shown in FIG. 11.

FIG. 12 is a block diagram showing the internal configuration of the smartphone 200 shown in FIG. 11. As shown in FIG. 12, the smartphone 200 is equipped with, as main constituent elements, a wireless communication unit 210, the display/input unit 204, a telephone unit 211, the manipulation members 207, the camera unit 208, a storage unit 212, an external input/output unit 213, a GPS (global positioning system) reception unit 214, a motion sensor unit 215, a power unit 216, and a main control unit 220. The smartphone 200 is also provided with, as a main function, a wireless communication function for performing a mobile wireless communication via a base station BS (not shown) and a mobile communication network NW (not shown).

The wireless communication unit 210 serves to perform a wireless communication with a base station BS of the mobile communication network NW under the control of the main control unit 220. By performing such wireless communications, the wireless communication unit 210 sends and receives various file data such as audio data and image data, e-mail data, etc. and receives web data, streaming data, etc.

The display/input unit 204 is what is called a touch panel that, under the control of the main control unit 220, displays an image (still image and moving image), text information, etc. and thereby gives information to a user visually as well as detects a user manipulation on displayed information. The display/input unit 204 is equipped with the display panel 202 and the manipulation panel 203.

The display panel 202 uses, as a display device, an LCD (liquid crystal display), an GELD (organic electroluminescence display), or the like.

The manipulation panel 203 is a device that is placed so as to enable visual recognition of an image displayed on the display screen of the display panel 202 and detects one or plural sets of coordinates of a manipulation by a user finger or a stylus. When manipulated by a user finger or a stylus, this device outputs, to the main control unit 220, a detection signal that is generated as a result of the manipulation. Then the main control unit 220 detects a manipulation position (coordinates) on the display panel 202 on the basis of the received detection signal.

As shown in FIG. 11, in the smartphone 200 according to the embodiment of the invention which is an example imaging apparatus, the display/input unit 204 is configured as the integrated unit of the display panel 202 and the manipulation panel 203 and the manipulation panel 203 is disposed in such a manner as to cover the display panel 202 completely.

Where this arrangement is employed, the manipulation panel 203 may have a function of detecting a user manipulation that is made even outside the area of the display panel 202. In other words, the manipulation panel 203 may be provided with a detection area (hereinafter referred to as a "display area") corresponding to its portion that coextends with the display panel 202 and a detection area (hereinafter referred to as a "non-display area") corresponding to its peripheral portion that does not coextend with the display panel 202.

The size of the display area may be completely the same as that of the display panel 202 (they need not always be the same). The manipulation panel 203 may be provided with two sensing areas, that is, a peripheral portion and an inside portion that is a portion other than the peripheral portion. Furthermore, the width of the peripheral portion is designed as appropriate so as to be suitable for the size of the body 201 and other factors. Still further, the position detection method of the manipulation panel 203 may be any of various methods such as a matrix switch method, a resistive film method, a surface acoustic wave method, an infrared method, an electromagnetic induction method, and a capacitance method.

Provided with the speaker 205 and the microphone 206, the telephone unit 211 serves to convert a user voice that is input through the microphone 206 into audio data that can be processed by the main control unit 220 and output the latter to the main control unit 220 and also serves to decode audio data that is received by the wireless communication unit 210 or the external input/output unit 213 and output decoded data from the speaker 205. For another example, the speaker 205 and the microphone 206 may be installed in the same surface as the display/input unit 204 is and a side surface of the body 201, respectively.

The manipulation members 207 are hardware keys using key switches or the like and serve to receive user instructions. For example, as shown in FIG. 11, the manipulation members 207 are push-button switches that are installed in a side surface of the body 201 of the smartphone 200 and that are turned on when pushed down by a finger or the like and turned off due to the recovery force of a spring or the like when the finger is released.

The storage unit 212 serves to store control programs and control data of the main control unit 220, application software, address data in which a name, a telephone number, etc. of each party to communicate with are correlated with each other, data of e-mails that have been sent out or received, web data that have been downloaded by web browsing, and downloaded content data, and also serves to store streaming data etc. temporarily. The storage unit 212 consists of an internal storage unit 217 which is incorporated in the smartphone 200 and an external storage unit 218 that is detachable from an external memory slot. Each of the internal storage unit 217 and the external storage unit 218 which constitute the storage unit 212 is implemented using a storage medium of any of such types as a flash memory, a hard disk drive, Multimedia Card micro, a card-type memory (e.g., microSD (registered trademark) memory), a RAM (random access memory), and a ROM (read-only memory).

The external input/output unit 213 plays a role of interfacing with every external device connected to the smartphone 200, and serves to connect to an external device directly or indirectly by a communication line or the like (e.g., universal serial bus (USB) or IEEE 1394) or a network (e.g., Internet, wireless LAN, Bluetooth (registered trademark), RFID (Radio Frequency Identification), Infrared Data Association (IrDA; registered trademark), UWB (ultra-wideband; registered trademark), or ZigBee (registered trademark)).

Example external devices to be connected to the smartphone 200 are a wired/wireless headset, a wired/wireless external charger, a wired/wireless data port, a memory card, a SIM (Subscriber Identity Module) card, and a UIM (User Identity Module) card which are connected via a card socket, an external audio/video device which is connected via an audio/video I/O (input/output) terminal, an external audio/video device which is connected wirelessly, a smartphone which is connected by wire or wirelessly, a personal computer which is connected by wire or wirelessly, a PDA which is connected by wire or wirelessly, and an earphone. The external input/output unit 213 can give data transmitted from such an external device to internal constituent elements of the smartphone 200 and allows internal data of the smartphone 200 to be transmitted to such an external device.

According to instructions from the main control unit 220, the GPS reception unit 214 receives plural GPS signals transmitted from GPS satellites ST1-STn, performs positioning calculation processing on the basis of the received GPS signals, and detects a position (i.e., latitude, longitude, and height) of the smartphone 200. If position information can be acquired from the wireless communication unit 210 or the external input/output unit 213 (e.g., wireless LAN), the GPS reception unit 214 can also detect a position using that position information.

Equipped with, for example, a 3-axis acceleration sensor, the motion sensor unit 215 detects physical motion of the smartphone 200 according to instructions from the main control unit 220, as a result of which a movement direction and acceleration of the smartphone 200 can be detected. Detection results are output to the main control unit 220.

The power unit 216 supplies power stored in a battery (not shown) to the individual units of the smartphone 200 according to instructions from the main control unit 220.

Equipped with a microprocessor, the main control unit 220 operates according to control programs and control data stored in the storage unit 212 and supervises the individual units of the smartphone 200. To perform a voice communication or a data communication via the wireless communication unit 210, the main control unit 220 has a mobile communication control function for controlling the individual units for communication and application processing functions.

The application processing functions are realized in such a manner that the main control unit 220 operates according to application software that is stored in the storage unit 212. For example, the application processing functions are an infrared communication function of performing a data communication with a confronting device by controlling the external input/output unit 213, an e-mail function of sending and receiving an e-mail, and a web browsing function of browsing a web page.

The main control unit 220 has an image processing function for, for example, displaying video on the display/input unit 204 on the basis of image data (still image data or moving image data) such as reception data or downloaded streaming data. The image processing function means a function that the main control unit 220 decodes image data as mentioned above, performs image processing on a decoding result, and displays a resulting image on the display/input unit 204.

Furthermore, the main control unit 220 performs a display control on the display panel 202 and a manipulation detection control for detecting a user manipulation that is made using the manipulation members 207 or the manipulation panel 203. By performing a display control, the main control unit 220 displays icons for activation of application software, software keys such as scroll bars, and a window for writing an e-mail. The scroll bars are software keys for receiving an instruction for moving a display portion of, for example, a large image that cannot be displayed fully in the display area of the display panel 202.

By performing a manipulation detection control, the main control unit 220 detects a user manipulation that is made using the manipulation members 207, receives a manipulation on an icon as mentioned above or input of a character string to an input box of a window as mentioned above, or receives a display image scroll request that is made through a scroll bar.

The main control unit 220 also has a touch panel control function that the main control unit 220 judges whether a position of a manipulation on the manipulation panel 203 is in the coextending portion (display area) that coextends with the display panel 202 or the other portion, that is, the peripheral portion (non-display area) that does not coextend with the display panel 202 by performing a manipulation detection control and controls the sensing areas of the manipulation panel 203 and the display positions of software keys.

The main control unit 220 can also detect a gesture manipulation on the manipulation panel 203 and performs a preset function according to the detected gesture manipulation. The gesture manipulation is not a conventional simple touch manipulation but a manipulation of drawing a locus with a finger or the like, specifying plural positions simultaneously, or drawing loci from plural position to at least one position by combining such manipulations.

The camera unit 208 includes those units of the digital camera shown in FIG. 1 which exclude the external memory control unit 20, the recording medium 21, the display control unit 22, the display unit 23, and the manipulation unit 14. Shot image data generated by the camera unit 208 can be recorded in the storage unit 212 or output via the input/ output unit 213 or the wireless communication unit 210. Although in the smartphone 200 shown in FIG. 11 the camera unit 208 is installed in the same surface as the display/input unit 204 is, the installation position of the camera unit 208 is not limited to that position; the camera unit 208 may be installed on the back side of the display/input unit 204.

The camera unit 208 can be used for various functions of the smartphone 200. For example, an image acquired by the camera unit 208 can be displayed on the display panel 202 or used as one manipulation input made through the manipulation panel 203. The GPS reception unit 214 can detect a position by referring to an image that is supplied from the camera unit 208. Furthermore, an optical axis direction of the camera unit 208 of the smartphone 200 can be judged or its current use environment can be judged by referring to an image supplied from the camera unit 208 using or without using the 3-axis acceleration sensor. Naturally, an image supplied from the camera unit 208 can be used in application software.

In addition, an operation is possible that image data of a still image or a moving image is added with position information acquired by the GPS reception unit 214, audio information acquired by the microphone 206 (may be converted into text information by the main control unit 220 or the like through audio-to-text conversion), posture information acquire by the motion sensor unit 215, or another kind of information and is then recorded in the recording unit 212 or output via the input/output unit 213 or the wireless communication unit 210.

Also in the smartphone 200 having the above configuration, high-accuracy phase difference autofocusing and high-quality shooting can be realized in such a manner that the solid-state imaging device 5 is used as an imaging device of the camera unit 208 and the camera unit 208 performs the operation shown in FIG. 6 or 7.

As described above, the following items are disclosed in this specification:

The disclosed imaging apparatus is an imaging apparatus comprising an imaging device having a photodetecting surface in which plural imaging pixels and plural phase difference detection pixels are arranged, the plural imaging pixels detecting an image formed by a light beam that passes through a pupil region of an imaging optical system, the plural phase difference detection pixels including plural first phase difference detection pixels that detect one of a pair of images formed by a pair of light beams that pass through different portions of the pupil region of the imaging optical system and plural second phase difference detection pixels that detect the other of the pair of images, and plural phase difference detection areas being arranged in the photodetecting surface of the imaging device in a deviation direction of the pair of images, plural pairs of a first phase difference detection pixel and a second phase difference detection pixel being arranged in each of the plural phase difference detection areas; an exposure determining unit which determines exposure conditions on the basis of output signals of phase difference detection pixels existing in a selected one of the plural phase difference detection areas; and a defocus amount calculation unit which calculates a defocus amount using output signals of the first phase difference detection pixels and the second phase difference detection pixels existing in the selected phase difference detection area that are part of a shot image signal produced by shooting that is performed by the imaging device under the exposure conditions determined by the exposure determining unit, wherein the exposure determining unit selects phase difference detection pixels from the selected phase difference detection area according to a sensitivity difference between phase difference detection pixels that exhibit a highest sensitivity in the selected phase difference detection area and phase difference detection pixels that exhibit a lowest sensitivity in the selected phase difference detection area or a position, in the photodetecting surface, of the selected phase difference detection area in the deviation direction, and determines exposure conditions on the basis of output signals of the selected phase difference detection pixels.

In the disclosed imaging apparatus, if the selected phase difference detection area is such that the sensitivity difference is larger than a predetermined value, the exposure determining unit determines exposure conditions on the basis of output signals of the phase difference detection pixels that exhibit the highest sensitivity in the selected phase difference detection area.

In the disclosed imaging apparatus, if the selected phase difference detection area is such that the sensitivity difference is smaller than or equal to a predetermined value, the exposure determining unit determines exposure conditions on the basis of output signals of average sensitivity pixels that are phase difference detection pixels whose sensitivities coincide with an average of sensitivities of all of the phase difference detection pixels existing in the selected phase difference detection area.

In the disclosed imaging apparatus, if the position of the selected phase difference detection area is an end position in the deviation direction, the exposure determining unit determines exposure conditions on the basis of output signals of the phase difference detection pixels that exhibit the highest sensitivity in the selected phase difference detection area.

In the disclosed imaging apparatus, if the selected phase difference detection area includes a straight line that passes a point where an optical axis of the imaging optical system intersects the photodetecting surface and extends perpendicularly to the deviation direction, the exposure determining unit determines exposure conditions on the basis of output signals of average sensitivity pixels that are phase difference detection pixels whose sensitivities coincide with an average of sensitivities of all of the phase difference detection pixels existing in the selected phase difference detection area.

The disclosed imaging apparatus further comprises an output signal level judging unit that, when the exposure determining unit has selected the average sensitivity pixels and determined exposure conditions on the basis of the output signals of the average sensitivity pixels, judges a level of output signals of phase difference detection pixels that exhibit a highest sensitivity in the selected phase difference detection area that are part of a shot image signal produced by shooting that is performed by the imaging device under the determined exposure conditions, wherein if the output signal level judging unit judges that the level is lower than a threshold value, the defocus amount calculation unit calculates a defocus amount using the shot image signal; and if the output signal level judging unit judges that the level is higher than or equal to the threshold value, the exposure determining unit selects the phase difference detection pixels that exhibit the highest sensitivity in the selected phase difference detection area and determines exposure conditions again on the basis of output signals of the selected phase difference detection pixels and the defocus amount calculation unit calculates a defocus amount using a shot image signal produced by shooting that is performed under the exposure conditions determined again.

The disclosed imaging apparatus further comprises an output signal level judging unit that, when the exposure determining unit has selected the average sensitivity pixels and determined exposure conditions on the basis of the output signals of the average sensitivity pixels, judges a level of output signals of phase difference detection pixels that exhibit a highest sensitivity in the selected phase difference detection area that are part of a shot image signal produced by shooting that is performed by the imaging device under the determined exposure conditions, wherein if the output signal level judging unit judges that the level is lower than a threshold value, the defocus amount calculation unit calculates a defocus amount using the shot image signal; and if the output signal level judging unit judges that the level is higher than or equal to the threshold value, the defocus amount calculation unit calculates a defocus amount using part, excluding output signals of phase difference detection pixels whose levels are higher than the threshold value, of the shot image signal.

The disclosed exposure determining method is an exposure determining method that uses an imaging device having a photodetecting surface in which plural imaging pixels and plural phase difference detection pixels are arranged, wherein the plural imaging pixels detect an image formed by a light beam that passes through a pupil region of an imaging optical system, the plural phase difference detection pixels include plural first phase difference detection pixels that detect one of a pair of images formed by a pair of light beams that pass through different portions of the pupil region of the imaging optical system and plural second phase difference detection pixels that detect the other of the pair of images, and plural phase difference detection areas are arranged in the photodetecting surface of the imaging device in a deviation direction of the pair of images, plural pairs of a first phase difference detection pixel and a second phase difference detection pixel being arranged in each of the plural phase difference detection areas, the exposure determining method comprising an exposure determining step of determining exposure conditions on the basis of output signals of phase difference detection pixels existing in a selected one of the plural phase difference detection areas; and a defocus amount calculating step of calculating a defocus amount using output signals of the first phase difference detection pixels and the second phase difference detection pixels existing in the selected phase difference detection area that are part of a shot image signal produced by shooting that is performed by the imaging device under the determined exposure conditions, wherein the exposure determining step selects phase difference detection pixels from the selected phase difference detection area according to a sensitivity difference between phase difference detection pixels that exhibit a highest sensitivity in the selected phase difference detection area and phase difference detection pixels that exhibit a lowest sensitivity in the selected phase difference detection area or a position, in the photodetecting surface, of the selected phase difference detection area in the deviation direction, and determines exposure conditions on the basis of output signals of the selected phase difference detection pixels.

INDUSTRIAL APPLICABILITY

The invention is useful when applied to digital cameras.

Although the invention has been described above using the particular embodiments, the invention is not limited to the embodiments and various changes are possible without departing from the technical concept of the disclosed invention.

The invention claimed is:

1. An imaging apparatus comprising:
an imaging device having a photodetecting surface at which plural imaging pixels and plural phase difference detection pixels are arranged,
the plural imaging pixels detecting an image formed by a light beam that passes through a pupil region of an imaging optical system,
the plural phase difference detection pixels comprising plural first phase difference detection pixels that detect one of a pair of images formed by a pair of light beams that pass through different portions of the pupil region of the imaging optical system and plural second phase difference detection pixels that detect other of the pair of images, and
plural phase difference detection areas being arranged at the photodetecting surface of the imaging device in a deviation direction of the pair of images, plural pairs of the first phase difference detection pixel and the second phase difference detection pixel being arranged in each of the plural phase difference detection areas;
an electrical control system configured to:
determine exposure conditions based on output signals of phase difference detection pixels existing in a selected one of the plural phase difference detection areas; and
calculate unit which calculates a defocus amount using output signals of the first phase difference detection pixels and the second phase difference detection pixels existing in the selected phase difference detection area that are part of a shot image signal produced by shooting that is performed by the imaging device under the exposure conditions determined by the electrical control system,
wherein if the selected phase difference detection area is such that a sensitivity difference between phase difference detection pixels that exhibit a highest sensitivity in the selected phase difference detection area and phase difference detection pixels that exhibit a lowest sensitivity in the selected phase difference detection area is larger than a predetermined value, the electrical control system determines exposure conditions based on output signals of the phase difference detection pixels that exhibit the highest sensitivity in the selected phase difference detection area, and
wherein if the selected phase difference detection area is such that the sensitivity difference is smaller than or equal to a predetermined value, the electrical control system determines exposure conditions based on output signals of average sensitivity pixels that are phase difference detection pixels whose sensitivities coincide with an average of sensitivities of all of the phase difference detection pixels existing in the selected phase difference detection area.

2. The imaging apparatus according to claim 1, further comprising an output signal level judging unit that, when the electrical control system has determined exposure conditions based on the output signals of the average sensitivity pixels, judges a level of output signals of phase difference detection pixels that exhibit a highest sensitivity in the selected phase difference detection area that are part of a shot image signal produced by shooting that is performed by the imaging device under the determined exposure conditions, wherein:

if the output signal level judging unit judges that the level is lower than a threshold value, the electrical control system calculates a defocus amount using the shot image signal; and if the output signal level judging unit judges that the level is higher than or equal to the threshold value, the electrical control system selects the phase difference detection pixels that exhibit the highest sensitivity in the selected phase difference detection area and determines exposure conditions again based on output signals of the selected phase difference detection pixels and the electrical control system calculates a defocus amount using a shot image signal produced by shooting that is performed under the exposure conditions determined again.

3. The imaging apparatus according to claim 1, further comprising an output signal level judging unit that, when the electrical control system has determined exposure conditions based on the output signals of the average sensitivity pixels, judges a level of output signals of phase difference detection pixels that exhibit a highest sensitivity in the selected phase difference detection area that are part of a shot image signal produced by shooting that is performed by the imaging device under the determined exposure conditions, wherein:

if the output signal level judging unit judges that the level is lower than a threshold value, the electrical control system calculates a defocus amount using the shot image signal; and if the output signal level judging unit judges that the level is higher than or equal to the threshold value, the electrical control system calculates a defocus amount using part, excluding output signals of phase difference detection pixels whose levels are higher than the threshold value, of the shot image signal.

4. An exposure determining method for an imaging device having a photodetecting surface at which plural imaging pixels and plural phase difference detection pixels are arranged, wherein:

the plural imaging pixels detect an image formed by a light beam that passes through a pupil region of an imaging optical system, the plural phase difference detection pixels comprise plural first phase difference detection pixels that detect one of a pair of images formed by a pair of light beams that pass through different portions of the pupil region of the imaging optical system and plural second phase difference detection pixels that detect the other of the pair of images, and plural phase difference detection areas are arranged at the photodetecting surface of the imaging device in a deviation direction of the pair of images, plural pairs of a first phase difference detection pixel and a second phase difference detection pixel being arranged in each of the plural phase difference detection areas, the exposure determining method comprising:

determining exposure conditions based on output signals of phase difference detection pixels existing in a selected one of the plural phase difference detection areas; and calculating a defocus amount using output signals of the first phase difference detection pixels and the second phase difference detection pixels existing in the selected phase difference detection area that are part of a shot image signal produced by shooting that is performed by the imaging device under the determined exposure conditions, wherein if the selected phase difference detection area is such that a sensitivity difference between phase difference detection pixels that exhibit a highest sensitivity in the selected phase difference detection area and phase difference detection pixels that exhibit a lowest sensitivity in the selected phase difference detection area is larger than a predetermined value, the determining of exposure conditions determines exposure conditions based on output signals of the phase difference detection pixels that exhibit the highest sensitivity in the selected phase difference detection area, and wherein if the selected phase difference detection area is such that the sensitivity difference is smaller than or equal to a predetermined value, the determining of exposure conditions determines exposure conditions based on output signals of average sensitivity pixels that are phase difference detection pixels whose sensitivities coincide with an average of sensitivities of all of the phase difference detection pixels existing in the selected phase difference detection area.

* * * * *